US012640321B2

(12) United States Patent
Seo

(10) Patent No.: US 12,640,321 B2
(45) Date of Patent: May 26, 2026

(54) VACUUM CIRCUIT BREAKER

(71) Applicant: LS ELECTRIC CO., LTD., Anyang-si (KR)

(72) Inventor: Minkyu Seo, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 170 days.

(21) Appl. No.: 18/285,051

(22) PCT Filed: Jan. 17, 2022

(86) PCT No.: PCT/KR2022/000849
§ 371 (c)(1),
(2) Date: Sep. 29, 2023

(87) PCT Pub. No.: WO2022/211235
PCT Pub. Date: Oct. 6, 2022

(65) Prior Publication Data
US 2024/0186085 A1      Jun. 6, 2024

(30) Foreign Application Priority Data

Mar. 31, 2021      (KR) ........................ 10-2021-0042100

(51) Int. Cl.
*H01H 33/59*      (2006.01)
*G01K 1/14*       (2021.01)
(52) U.S. Cl.
CPC .............. *H01H 33/59* (2013.01); *G01K 1/14* (2013.01)
(58) Field of Classification Search
CPC .. H01H 33/59; H01H 33/6606; H01H 33/666; H01H 11/0062; H01H 2011/0068;
(Continued)

(56) References Cited

U.S. PATENT DOCUMENTS 5,929,410 A * 7/1999 Mun ...................... H02B 11/04
218/123
7,696,447 B2 * 4/2010 Chen .................... H01H 3/3005
335/171
(Continued)

FOREIGN PATENT DOCUMENTS

CN          202255681 U      5/2012
CN          202816780 U      3/2013
(Continued)

OTHER PUBLICATIONS

Translation of KR101773306 (Original document published Aug. 31, 2017) (Year: 2017).*

(Continued)

*Primary Examiner* — William A Bolton
(74) *Attorney, Agent, or Firm* — K&L Gates LLP

(57) ABSTRACT

Disclosed is a vacuum circuit breaker capable of measuring and monitoring the temperature of a specific point, the vacuum circuit breaker comprising a temperature detection sensor located adjacent to an electric conduction pole. The temperature detection sensor includes: a sensor body located adjacent to one side of a plate part of the electric conduction pole; a fixing terminal which can be brought into contact with a specific point of the electric conduction pole to measure the temperature of the specific point; and a connection line which is located inside an electric conduction pole terminal of the electric conduction pole, and has one end coupled to the sensor body and the other end coupled to the fixing terminal.

14 Claims, 11 Drawing Sheets

(58) Field of Classification Search
CPC .......... H02B 11/04; H02B 11/10; G01K 1/14; G01K 7/00
USPC ................. 218/118, 120, 134, 138, 153, 154
See application file for complete search history.

(56) References Cited

U.S. PATENT DOCUMENTS

| | | | | |
|---|---|---|---|---|
| 10,141,126 B2 * | 11/2018 | Belloni | .................... | H01H 1/38 |
| 10,533,978 B2 * | 1/2020 | Benke | .................... | G01N 29/46 |
| 10,741,338 B1 * | 8/2020 | Wang | ........................ | H01H 1/38 |
| 2015/0139275 A1 * | 5/2015 | Park | ........................ | G01K 13/00 |
| | | | | 374/152 |
| 2018/0082812 A1 * | 3/2018 | Yang | ........................ | H01F 38/14 |

FOREIGN PATENT DOCUMENTS

| | | | |
|---|---|---|---|
| CN | 203274957 | U | 11/2013 |
| CN | 203405292 | U | 1/2014 |
| CN | 105425147 | A | 3/2016 |
| CN | 206432194 | U | 8/2017 |
| CN | 107421653 | A | 12/2017 |
| CN | 208296994 | U | 12/2018 |
| CN | 109613426 | A | 4/2019 |
| CN | 208738127 | U | 4/2019 |
| CN | 208805294 | U | 4/2019 |
| CN | 209266992 | U | 8/2019 |
| CN | 209841234 | U | 12/2019 |
| CN | 210073704 | U | 2/2020 |
| EP | 2874170 | A1 | 5/2015 |
| JP | 2019023972 | A | 2/2019 |
| KR | 20140044206 | A | 4/2014 |
| KR | 20150057107 | A | 5/2015 |
| KR | 20160047883 | A | 5/2016 |
| KR | 101670304 | B1 | 10/2016 |
| KR | 101773306 | B1 | 8/2017 |
| KR | 20200094403 | A | 8/2020 |

OTHER PUBLICATIONS

Translation of CN202816780 (Original documents published Mar. 20, 2013) (Year: 2013).*

International Search Report for related International Application No. PCT/KR2022/000849; action dated Oct. 6, 2022; (2 pages).

Written Opinion for related International Application No. PCT/KR2022/000849; action dated Oct. 6, 2022; (3 pages).

Notice of Allowance for related Korean Application No. 10-2021-0042100; action dated Feb. 7, 2023; (2 pages).

Search Report of related Korean Application No. 10-2021-0042100; report dated Oct. 15, 2020; (14 pages).

Notice of Allowance for related Japanese Application No. 2023-544480; action dated May 28, 2024; (3 pages).

Extended European Search Report for related European Application No. 22781356.5; action dated Jan. 13, 2025; (9 pages).

\* cited by examiner

VACUUM CIRCUIT BREAKER

CROSS-REFERENCE TO RELATED APPLICATIONS

This application is the National Stage filing under 35 U.S.C. 371 of International Application No. PCT/KR2022/000849, filed on Jan. 17, 2022, which claims the benefit of earlier filing date of and rights of priority to Korean Application 10-2021-0042100, filed on Mar. 31, 2021, the contents of which are all hereby incorporated by reference herein in their entirety.

FIELD

The present disclosure relates to a vacuum circuit breaker, and more particularly, to a vacuum circuit breaker capable of measuring and monitoring temperature of a specific point.

BACKGROUND

A vacuum circuit breaker is a device that is provided to break a circuit when a fault current such as overcurrent, short circuit, or ground fault occurs on an extra-high voltage or high-voltage distribution line.

A vacuum circuit breaker may be switched to a closed or trip state. In the closed state, the vacuum circuit breaker is electrically connected to an external power source or load. In the trip state, the vacuum circuit breaker is electrically disconnected from the external power source or load.

The vacuum circuit breaker includes various components. As the vacuum circuit breaker operates, the components operate and heat is generated. In addition, even when an abnormal current is applied from the external power source, excessive heat may be generated from each of the components of the vacuum circuit breaker.

When the generated heat stays in the vacuum circuit breaker for a preset time or longer, each of the components of the vacuum circuit breaker may be damaged. Accordingly, the vacuum circuit breaker generally includes a temperature detection sensor configured to measure external or internal temperature.

A heating value of the vacuum circuit breaker varies depending on portions of the vacuum circuit breaker. In this case, a damage caused by heating may occur to a portion in which the heating value is high. However, it is difficult to detect temperature of a specific point by using a vacuum circuit breaker in the related art.

This may have a disadvantageous effect on prevention of a thermal accident in the vacuum circuit breaker. In addition, this may cause an unnecessary increase in cost and time for temperature detection in the vacuum circuit breaker.

Accordingly, development of a vacuum circuit breaker capable of measuring and monitoring temperature of a specific point in the vacuum circuit breaker in real time may be considered.

Korea Patent Registration No. KR 10-1773306 discloses a wireless temperature detecting device in a distribution panel. In detail, a wireless temperature detecting device installed in one of a tulip contactor, a main bus, or a cable terminal unit in a circuit breaker equipped in the distribution panel is disclosed.

This type of temperature detecting device is positioned outside the circuit breaker. That is, the temperature detecting device is exposed to outside of the circuit breaker. Accordingly, the temperature detecting device may be electrically conducted to outside of the circuit breaker to thereby cause a damage.

Chinese Registration Patent NO. CN 208,296,994 discloses a temperature sensor in a distribution panel. In detail, a temperature sensor positioned in a low-pressure distribution panel is disclosed.

This type of temperature sensor is also attached to outside of a circuit breaker. Accordingly, the temperature sensor may be electrically conducted to outside of the circuit breaker, and thus, exposed to a faulty current to be damaged.

PRIOR ART DOCUMENTS

Patent Documents (Patent document 1) Korea Patent Registration No. KR 10-1773306 (published on Aug. 31, 2017)
(Patent document 2) Chinese Patent Registration No. CN 208,296,994 (published on Dec. 28, 2018)

SUMMARY

Therefore, to obviate those problems, an aspect of the detailed description is to provide a vacuum circuit breaker capable of measuring and monitoring temperature of a specific point in real time.

Another aspect of the detailed description is to provide a vacuum circuit breaker such that a damage to a temperature detection sensor may be prevented.

Still another aspect of the detailed description is to provide a vacuum circuit breaker such that cost and time needed for heat temperature detection may be reduced.

To achieve these and other advantages and in accordance with the purpose of the present disclosure, as embodied and broadly described herein, there is provided a vacuum circuit breaker including: an electric conduction pole electrically connected to an external power source or a load; and a temperature detection sensor disposed adjacent to the electric conduction pole, wherein the electric conduction pole includes: a plate part provided to have a plate shape; and an electric conduction pole terminal provided to have a column shape extending in one direction and having one end coupled to the plate part, and the temperature detection sensor includes: a sensor body arranged adjacent to one side of the plate part and having an input unit accommodated therein; a fixing terminal which is in contact with a specific point of the electric conduction pole and configured to measure temperature of the specific point; and a connection line positioned in the electric conduction pole terminal, and having one end coupled to the sensor body and another end coupled to the fixing terminal.

Further, the electric conduction pole may include a tulip contactor in direct contact with a terminal of the external power source or the load, and the specific point may be positioned in a part of the tulip contactor.

Further, the fixing terminal may include: a connection line coupling part surrounding the another end of the connection line; and a target contact part being in contact with the specific point and coupled to the connection line coupling part.

Further, the electric conduction pole may include a tulip contactor in direct contact with a terminal of the external power source or the load, and the target contact part may be in contact with a part of the tulip contactor.

Further, the temperature detection sensor may include a fixing band coupled to the sensor body and arranged to surround the plate part.

Further, the fixing band may pass through a band insertion opening provided in the sensor body, and be coupled to the sensor body.

Further, the fixing band may pass through a band through hole provided in the plate part, and be coupled to the plate part.

Further, a protruding part extending toward the plate part may be provided at one side of the sensor body, and a recess part may be provided on one surface of the plate part facing the sensor body, the recess part having a shape corresponding to the protruding part and the protruding part being inserted through the recess part.

Further, the electric conduction pole may include a fixing clamp surrounding a part of the connection line and coupled to one surface of the plate part facing the connection line to have the connection line therebetween.

Further, the connection line may extend or retract to correspond to a distance between the sensor body and the fixing terminal.

Further, the fixing terminal may be provided in plurality, and the plurality of fixing terminals may be coupled to different connection lines, respectively.

Further, the input unit may collect temperature data from the fixing terminal, and the temperature detection sensor may include: a data processing unit configured to receive the temperature data from the input unit and process the temperature data; and a communication unit configured to transmit, to outside, the temperature data arranged by the data processing unit.

Further, a terminal hole may be provided in the electric conduction pole terminal.

Further, the fixing terminal may be accommodated in the terminal hole and coupled to one end of the electric conduction pole terminal.

Among various effects of the present disclosure, effects that can be obtained through the solution to problems will be described as follows.

First, the temperature detection sensor measures temperature of a specific point of a vacuum circuit breaker in real time. Accordingly, the specific point and a product state of the vacuum circuit breaker may be monitored in real time.

Accordingly, the vacuum circuit breaker may be managed in real time, and an accident due to heating may be prevented in advance. Further, a user may inspect any abnormality in the vacuum circuit breaker with reliability.

In addition, the temperature detection sensor is positioned in the vacuum circuit breaker. In detail, the temperature detection sensor is arranged adjacent to an electric conduction pole.

Thus, the temperature detection sensor may not be electrically connected to but insulated from outside. Accordingly, occurrence of an abnormal current such as an overcurrent, etc. in the temperature detection sensor may be prevented. Further, a damage to the temperature detection sensor may be prevented.

In addition, temperature detection of the whole vacuum circuit breaker is not necessarily needed.

Therefore, cost and time needed for temperature detection of the vacuum circuit breaker may be reduced. Further, convenience of work for detecting temperature of the vacuum circuit breaker may be enhanced.

DETAILED DESCRIPTION

Figure 1:
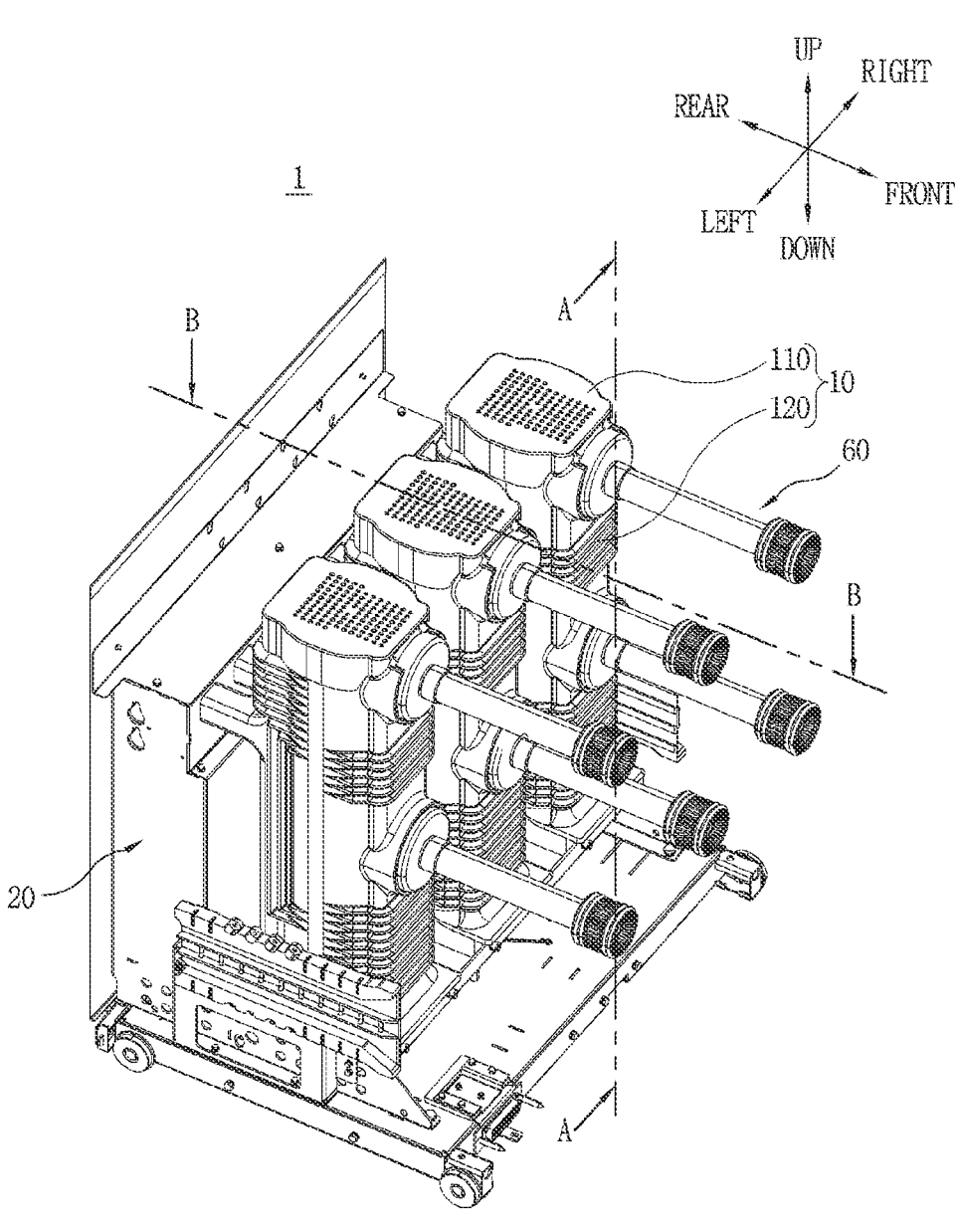
FIG. 1 is a perspective view of a vacuum circuit breaker according to an embodiment of the present disclosure.

Hereinafter, a vacuum circuit breaker 1 according to an embodiment of the present disclosure will be described in detail with reference to the drawings.

In the following description, descriptions of some components will be omitted to help understanding of the present disclosure.

In this specification, the same/like reference numerals are given to the same/like components even in different embodiments, and a redundant description thereof will be omitted.

The accompanying drawings are merely used to help easily understand the technical idea of the present disclosure and it should be understood that the idea of the present disclosure is not limited by the accompanying drawings.

A singular representation may include a plural representation unless it represents a definitely different meaning from the context.

Figure 4:
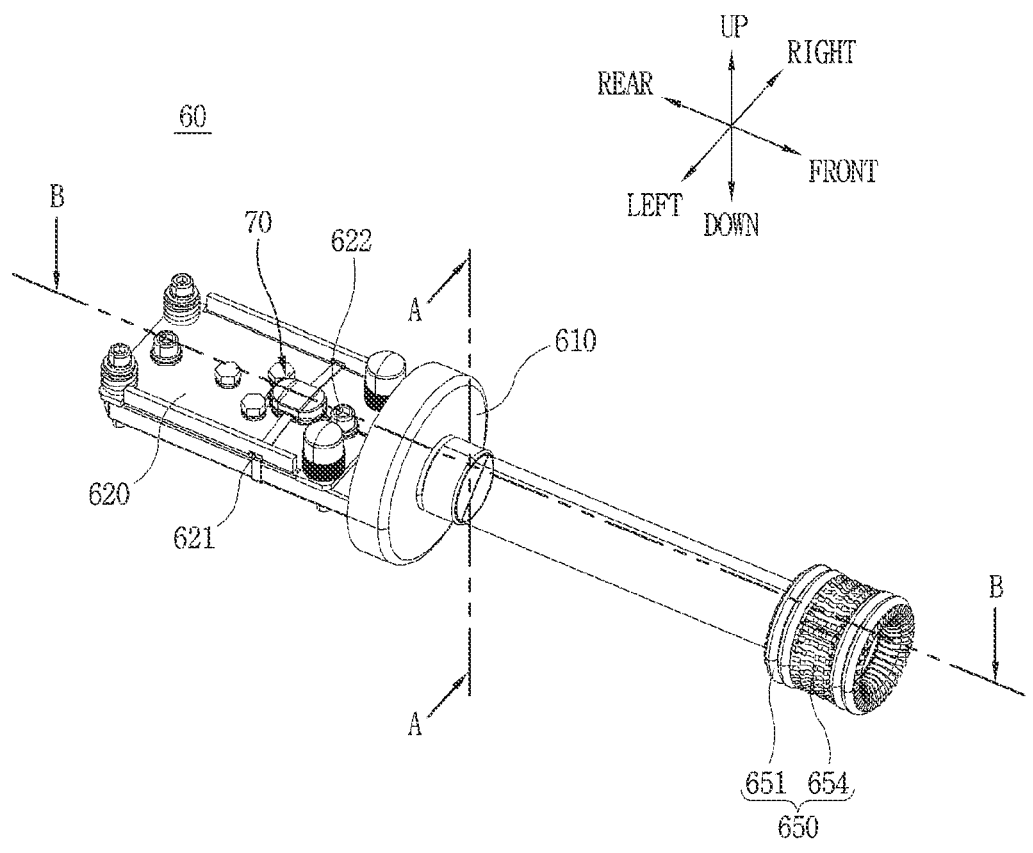
FIG. 4 is a perspective view of an electric conduction pole included in the vacuum circuit breaker of FIG. 1.
Figure 5:
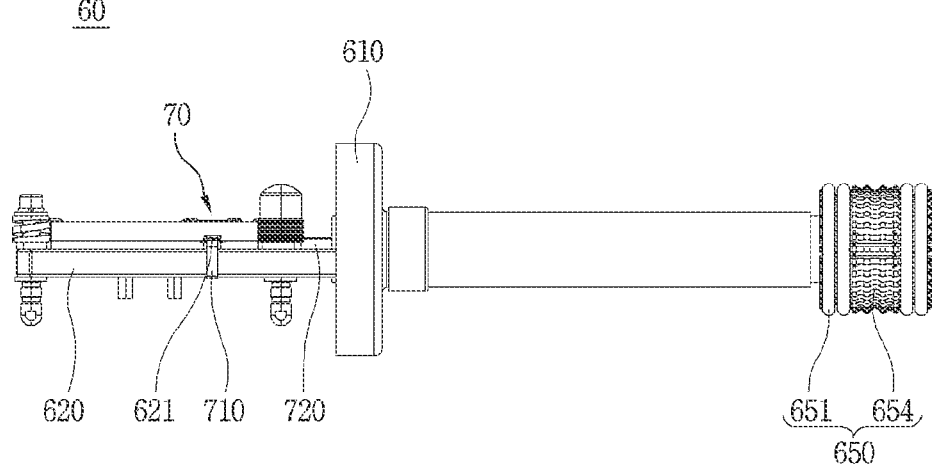
FIG. 5 is a side view of the electric conduction pole of FIG. 4.

The terms "upper," "lower," "left," "right,", "front," and "rear" used in the following description will be understood based on a coordinate system illustrated in FIGS. 1 and 4.

1. Description of the Vacuum Circuit Breaker 1 According to an Embodiment of the Present Disclosure.

Hereinafter, referring to FIGS. 1 to 8, the vacuum circuit breaker 1 according to an embodiment of the present disclosure will be described.

The vacuum circuit breaker 1 may allow or block a state of electrical connection between an external power source and a load. To do so, the vacuum circuit breaker 1 is electrically connected to the external power source and the load. In other words, the external power source and the load may be electrically connected to each other by the vacuum circuit breaker 1.

When a fixed contact point and a movable contact point of the vacuum circuit breaker 1 are in contact with each other, the external power source may be electrically connected to the load via the vacuum circuit breaker 1. On the other hand, when a fixed contact point and a movable contact point of the vacuum circuit breaker 1 are apart from each other, a state of electrical connection between the external power source and the load is blocked.

Figure 2:
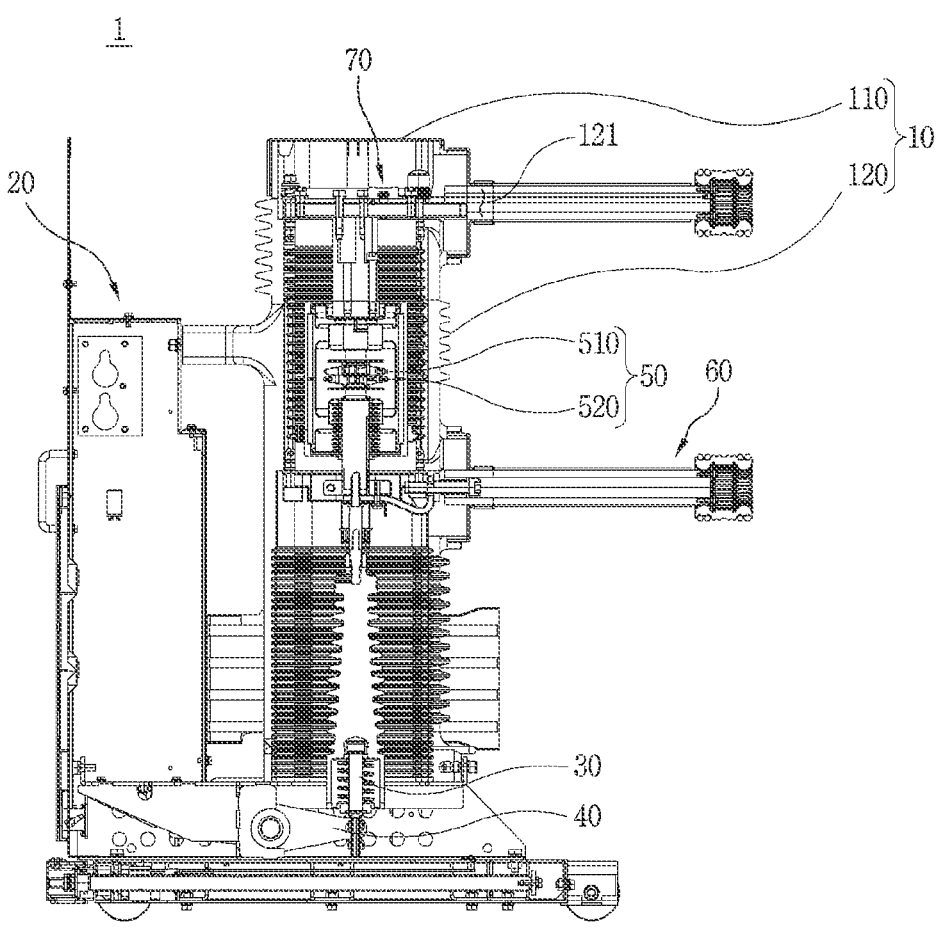
FIG. 2 is a side cross-sectional view of the vacuum circuit breaker of FIG. 1.
Figure 3:
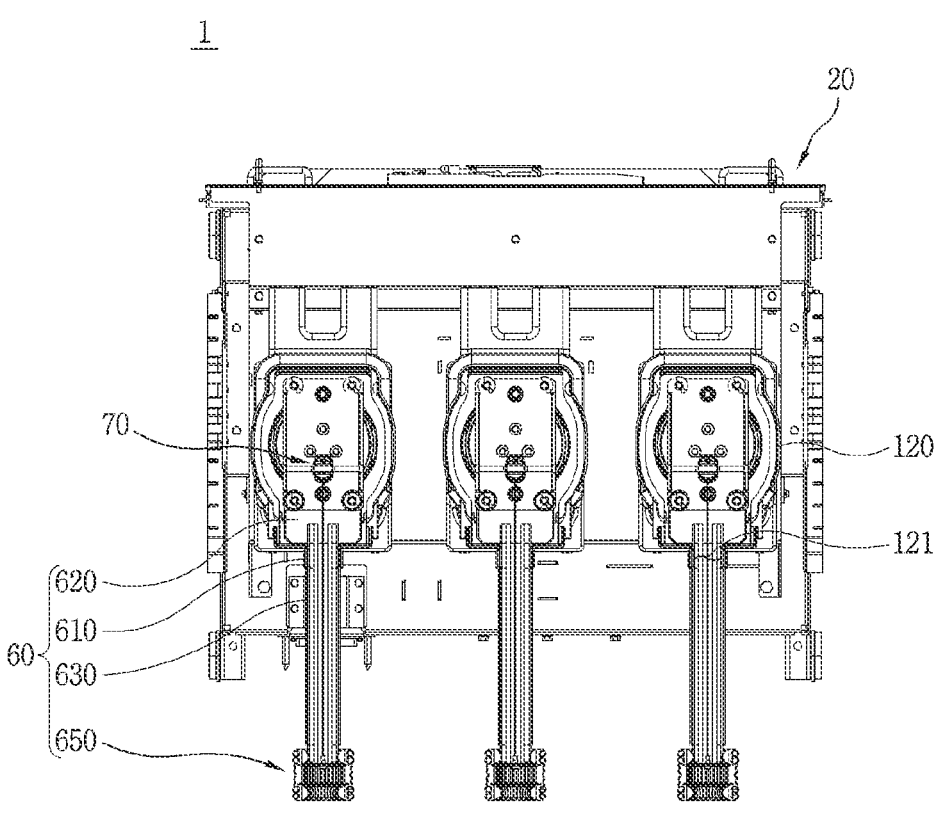
FIG. 3 is a plan cross-sectional view of the vacuum circuit breaker of FIG. 1.

Referring to FIGS. 1 to 3, the vacuum circuit breaker 1 according to an embodiment of the present disclosure includes a frame unit 10, a mechanism assembly 20, a link part 30, a spring part 40, a vacuum interrupter (VI) 50, an electric conduction pole 60, and a temperature detection sensor 70.

Hereinafter, referring to the attached drawings, a configuration of the vacuum circuit breaker 1 according to an embodiment of the present disclosure will be described. The frame unit 10, the mechanism assembly 20, the link part 30, the spring part 40, the VI 50, the electric conduction pole 60, and the temperature detection sensor 70 will be described in separate clauses.

(1) Description of the Frame Unit 10

Hereinafter, referring to FIGS. 1 to 3, the frame unit 10 is described.

The frame unit 10 forms an outer appearance of the vacuum circuit breaker 1. The frame unit 10 is a part in which the vacuum circuit breaker 1 is exposed to outside.

A space is provided in the frame unit 10. Various components configured to operate the vacuum circuit breaker 1 may be accommodated in the space. The various components may be surrounded by the frame unit 10 not to be exposed to outside.

In the illustrated embodiment, the mechanism assembly 20, the link part 30, the spring part 40, the VI 50, the electric conduction pole 60, and the temperature detection sensor 70 are accommodated in the space inside the frame unit 10.

In the illustrated embodiment, the frame unit 10 includes an upper frame 110 and a side frame 120.

The upper frame 110 is arranged at one side of the frame unit 10, i.e., at an upper side in the illustrated embodiment. The upper frame 110 is arranged to cover the space defined in the frame unit 10 from the upper side.

In the illustrated embodiment, the upper frame 110 is provided to have a rectangular plate shape in which an extending length in an anteroposterior direction is greater than an extending length in a left-and-right direction.

Edges of the upper frame 110 are respectively consecutive to the side frame 120.

The upper frame 110 may be provided in plurality. The plurality of upper frames 110 are spaced apart from each other.

The side frame 120 forms side surfaces of the frame unit 10, i.e., a left side, a right side, a front side, or a rear side of the frame unit 10 in the illustrated embodiment. The side frame 120 covers the space defined in the frame unit 10 from the left, right, front, and rear sides.

In the illustrated embodiment, the side frame 120 is provided to have a column shape extending in an upward-and-downward direction.

One edge of the side frame 120 in an extending direction is provided to be consecutive to the upper frame 110. In the illustrated embodiment, an upper edge of the side frame 120 is provided to be consecutive to the upper frame 110.

The side frame 120 may be provided in plurality. In this case, the plurality of side frames 120 are spaced apart from each other. In the illustrated embodiment, three side frames 120 are arranged in parallel with each other in a left-and-right direction.

An electric conduction pole insertion opening 121 capable of accommodating the electric conduction pole 60 is provided on an outer circumference of the side frame 120. In the illustrated embodiment, the electric conduction pole insertion opening 121 for accommodating the electric conduction pole 60 is provided on an outer circumference surface of the side frame 120 at a front side.

The electric conduction pole insertion opening 121 accommodates the electric conduction pole 60 such that the electric conduction pole 60 communicates with external and internal spaces of the side frame 120.

A space for accommodating the electric conduction pole 60 is defined inside the electric conduction pole insertion opening 121. That is, the electric conduction pole 60 is coupled through the electric conduction pole insertion opening 121.

The electric conduction pole insertion opening 121 extends in a same direction as an extending direction of the electric conduction pole 60. In the illustrated embodiment, the electric conduction pole insertion opening 121 extends in an anteroposterior direction.

The electric conduction pole insertion opening 121 is arranged to surround the electric conduction pole 60. That is, the electric conduction pole 60 is surrounded by the electric conduction pole insertion opening 121.

The electric conduction pole insertion opening 121 may be provided in plurality. A number of the electric conduction pole insertion openings 121 is identical to a number of the electric conduction poles 60 coupled to the side frames 120. In the illustrated embodiment, three pairs of electric conduction pole insertion openings 121 are arranged in parallel with each other along a left-and-right direction.

A number of the electric conduction pole insertion openings 121 may be determined according to a type of a power system including the vacuum circuit breaker 1 in the present disclosure. In one embodiment, the vacuum circuit breaker 1 is included in a power system using a circuit of three phases such as an R-phase, an S-phase, and a T-phase. Accordingly, three pairs of electric conduction pole insertion openings 121 are included in accordance with the three-phase circuit.

(2) Description of the Mechanism Assembly 20, the Link Part 30, and the Spring Part 40

Hereinafter, referring to FIGS. 1 to 3, the mechanism assembly 20, the link part 30, and the spring part 40 will be described.

The mechanism assembly 20 controls the vacuum circuit breaker 1 to operate in a closed state or a trip state. The mechanism assembly 20 is manipulated to be rotated to provide a state of electrical connection between the vacuum circuit breaker 1 and an external power source or a load, or block electrical connection therebetween.

The mechanism assembly 20 is accommodated in the space defined inside the frame unit 10. The mechanism assembly 20 may be operated to be rotated in the space.

The mechanism assembly 20 is connected to the link part 30 and the spring part 40. The mechanism assembly 20 may be operated to be rotated with at least one of the link part 30 and the spring part 40.

As the mechanism assembly 20 is operated, the link part 30 may be rotated to operate the vacuum circuit breaker 1 in a closed state or trip state.

The link part 30 is connected to the mechanism assembly 20. As components of the mechanism assembly 20 are rotated, the link part 30 may be rotated along with the components.

The link part 30 is rotatably coupled to the frame unit 10.

The link part 30 converts linear movement of a main shaft connected to the mechanism assembly 20 in a vertical direction into linear movement in a horizontal direction relative to a ground surface.

One end of the link part 30 is connected to a distal end of the main shaft. In addition, another end of the link part 30 is connected to the spring part 40.

As the link part 30 is rotated, the spring part 40 is linearly moved to cause a VI fixed contact point 510 and a VI movable contact point 520 to be in contact with or spaced apart from each other, The spring part 40 is connected to the link part 30. As the link part 30 is rotated, the spring part 40 may be linearly moved.

In addition, the spring part 40 is connected to the VI 50. In detail, the spring part 40 is connected to the VI movable contact part 520. As the spring part 40 is moved, the VI movable contact point 520 is moved together.

(3) Description of the Vacuum Interrupter (VI) 50

Hereinafter, referring to FIG. 2, the VI 50 is described.

The VI 50 is accommodated in the space defined inside the frame unit 10 to allow or block current conduction. In detail, as the VI fixed contact point 510 and the VI movable contact point 520 are brought into contact with each other, the VI 50 allows current conduction, or as the VI fixed contact point 510 is apart from the VI movable contact point 520, the VI 50 blocks current conduction.

The VI 50 is connected to the spring part 40. As the spring part 40 is moved, components of the VI 50 may come in contact with each other or be spaced apart from each other.

The VI 50 may be provided in plurality. In the illustrated embodiment, three VIs 50 are arranged in parallel with each other along a left-and-right direction.

A number of the VIs 50 may be determined according to a type of a power system including the vacuum circuit breaker 1 in the present disclosure. When the vacuum circuit breaker 1 is included in a power system using a circuit of three phases such as an R-phase, an S-phase, and a T-phase, three VIs 50 also may be included in accordance with the three phase circuit.

In the illustrated embodiment, the VI 50 includes a VI fixed contact point 510 and a VI movable contact point 520.

The VI fixed contact point 510 is electrically connected to an external power source or a load. The vacuum circuit breaker 1 may be electrically connected to an external power source or a load via the VI fixed contact point 510.

The VI fixed contact point 510 is accommodated inside the side frame 120. That is, the VI fixed contact point 510 is surrounded by the side frame 120.

The VI fixed contact point 510 may include a conductive material. For example, the VI fixed contact point 510 may include copper (Cu), silver (Ag), etc.

As the VI fixed contact point 510 is in contact with or apart from the VI movable contact point 520, an electrical connection between inside and outside of the vacuum circuit breaker 1 may be allowed or blocked.

The VI fixed contact point 510 is not moved in the inner space of the frame unit 10. Accordingly, the VI movable contact point 520 may be brought into a contact with or spaced apart from the VI fixed contact point 510 by moving the VI movable contact point 520.

The VI fixed contact point 510 may be provided in plurality. In the illustrated embodiment, three VI fixed contact points 510 are arranged in parallel with each other in a left-and-right direction.

The VI movable contact point 520 is electrically connected to an external power source or a load. In addition, the VI movable contact point 520 is electrically connected to or disconnected from the VI fixed contact point 510.

The VI movable contact point 520 is accommodated inside the side frame 120. That is, the VI fixed contact point 510 is surrounded by the side frame 120.

The VI movable contact point 520 may include a conductive material. For example, the VI movable contact point 520 may include copper (Cu), silver (Ag), etc.

The VI movable contact point 520 may be moved to be brought into contact with or spaced apart from the VI fixed contact point 510. In detail, the VI movable contact point 520 may be moved in a direction toward or away from the VI fixed contact point 510.

When the VI movable contact point 520 is moved in a direction toward the VI fixed contact point 510, the VI movable contact point 520 and the VI fixed contact point 510 come in contact with each other. In this case, an electrical connection between the external power source and the load may be allowed.

In addition, when the VI movable contact point 520 is moved in a direction away from the VI fixed contact point 510, the VI movable contact point 520 and the VI fixed contact point 510 are spaced apart from each other. In this case, an electrical connection between the external power source and the load is blocked.

The VI movable contact point 520 may be provided in plurality. In the illustrated embodiment, three VI movable contact point 520 are arranged in parallel with each other in a left-and-right direction.

(4) Description of the Electric Conduction Pole 60

Hereinafter, referring to FIGS. 1 to 8, the electric conduction pole 60 is described.

The electric conduction pole 60 electrically connects the VI 50 to an external power source or a load. To do so, the electric conduction pole 60 is electrically connected to the VI 50 and the external power source or the load.

The electric conduction pole 60 is coupled through one side of the side frame 120. In detail, the electric conduction pole 60 is coupled through the electric conduction pole insertion opening 121 in the side frame 120.

The electric conduction pole 60 may be provided in plurality. In the illustrated embodiment, three pairs of electric conduction poles 60 are arranged in parallel with each other in a left-and-right direction.

A number of the electric conduction poles 60 may be determined according to a type of a power system including the vacuum circuit breaker 1 in the present disclosure. In one embodiment, the vacuum circuit breaker 1 is included in a power system using a circuit of three phases such as an R-phase, an S-phase, and a T-phase. Accordingly, three pairs of electric conduction poles 60 are included in accordance with the three-phase circuit.

In the illustrated embodiment, the electric conduction pole 60 includes a housing part 610, a plate part 620, an electric conduction pole terminal 630, a coupling member 640, and a tulip contactor 650.

The housing part 610 forms an outer appearance of the electric conduction pole 60. The housing part 610 is a part in which the electric conduction pole 60 is exposed to outside.

The housing part 610 is provided to have a cylindrical shape extending in one direction. In the illustrated embodiment, the housing part 610 is provided to have a cylindrical shape extending in an anteroposterior direction.

A hollow hole is provided in the housing part 610. The hollow hole may accommodate the electric conduction pole terminal 630 therein. That is, the electric conduction pole terminal 630 is surrounded by the housing part 610.

The housing part 610 may be provided to include an insulating material. For example, the housing part 610 may be provided to include a synthetic resin material. Thus, an arbitrary electrical connection between inside and outside of the electric conduction pole 60 may be prevented.

The plate part 620 is a part in which the electric conduction pole 60 is directly coupled to the VI 50. In detail, the plate part 620 is electrically coupled to the VI 50.

The electric conduction pole terminal 630 is coupled to one end of the plate part 620. In the illustrated embodiment, the electric conduction pole terminal 630 is coupled to one end of the plate part 620 at a front side.

The plate part 620 is provided to have a plate shape. In the illustrated embodiment, the plate part 620 is provided to have a rectangular plate shape in which an extending length in an anteroposterior direction is greater than an extending length in a left-and-right direction.

The plate part 620 may be provided to include a conductive material. For example, the plate part 620 may include copper (Cu), silver (Ag), etc.

In the illustrated embodiment, the plate part 620 includes a band through hole 621 and a fixing clamp 622.

The band through hole 621 may be provided in one side of the plate part 620. In the illustrated embodiment, the band through hole 621 is provided in both left and right sides of the plate part 620.

The band through hole 621 allows the temperature detection sensor 70 to be securely coupled to the electric conduction pole 60.

The temperature detection sensor 70 is coupled through the band through hole 621. In detail, the fixing band 710 of the temperature detection sensor 70 is coupled through the band through hole 621.

In the illustrated embodiment, the band through hole 621 is provided such that a polygonal cross-section extends. However, the band through hole 621 is not limited to the illustrated shape, and may be provided in various shapes. For example, the band through hole 621 may be provided such that an oval cross-section extends.

The fixing clamp 622 prevents arbitrary deviation of the temperature detection sensor 70. In detail, the fixing clamp 622 fixes the connection line 720 to the plate part 620 to prevent arbitrary deviation of the connection line 720 of the temperature detection sensor 70.

To do so, the fixing clamp 622 surrounds a part of the connection line 720 to be coupled to the plate part 620. That is, the fixing clamp 622 and the plate part 620 are coupled to each other to have the connection line 720 therebetween.

The electric conduction pole terminal 630 is coupled to one end of the plate part 620.

The electric conduction pole terminal 630 electrically connects the plate part 620 to the tulip contactor 650. To do so, the electric conduction pole terminal 630 is electrically coupled respectively to the plate part 620 and the tulip contactor 650.

The electric conduction pole terminal 630 is accommodated in the space defined inside the housing part 610. That is, the electric conduction pole terminal 630 is surrounded by the housing part 610.

In the illustrated embodiment, the electric conduction pole terminal 630 is provided to have a cylindrical shape extending in an anteroposterior direction. However, the electric conduction pole terminal 630 is not limited to the illustrated shape, and may be provided in various shapes. For example, the electric conduction pole terminal 630 may have a polyprism shape.

In the illustrated embodiment, a terminal hole 631 is provided in the electric conduction pole terminal 630.

Some components of the temperature detection sensor 70 may be accommodated in the terminal hole 631. In the illustrated embodiment, the terminal hole 631 accommodates the connection line 720 and a fixing terminal 730 each included in the temperature detection sensor 70. A detailed description thereof will be given later.

The electric conduction pole terminal 630 is coupled to the tulip contactor 650 by the coupling member 640.

The coupling member 640 passes through the electric conduction pole terminal 630 and the tulip contactor 650 to secure the coupling therebetween.

The coupling member 640 is not limited to the illustrated shape, and may be provided in various shapes. In one embodiment, the coupling member 640 may be coupled to the electric conduction pole terminal 630 and the tulip contactor 650 by using a bolt-nut coupling method.

The coupling member 640 may be provided to include a highly rigid material. For example, the coupling member 640 may be provided to include a metal material.

The tulip contactor 650 is a part in which the vacuum circuit breaker 1 is in direct contact with a terminal of the external power source or the load.

In the illustrated embodiment, the tulip contactor 650 includes a fixing ring 651, a contactor plate 652, a saw-toothed ring 653, and a tulip finger 654.

The fixing ring 651 increases contact force between the tulip contactor 650 and the terminal of the external power source or the load.

The fixing ring 651 is positioned to surround an outer circumferential surface of the tulip finger 654. In detail, the fixing ring 651 is positioned in a coupling groove in the fixing ring 651 of the tulip finger 654.

The fixing ring 651 is provided to have a ring shape. In the illustrated embodiment, a center of the fixing ring 651 is provided to be identical to a center of the tulip finger 654.

The fixing ring 651 supports the tulip finger 654 at a radially outer side and prevents arbitrary deviation of the tulip finger 654.

In one embodiment, a diameter of the fixing ring 651 is provided to be smaller than an outer diameter of the tulip finger 654. Accordingly, contact force between the tulip finger 654 and the external terminal may increase.

The fixing ring 651 may be provided in plurality. In the illustrated embodiment, four fixing rings 651 are arranged in parallel with each other along an anteroposterior direction.

The contactor plate 652 and the saw-toothed ring 653 are positioned at a radially inner side of the fixing ring 651 and the tulip finger 654.

The contact plate 652 is positioned to meet the terminal of the external power source or the load.

The contactor plate 652 is electrically connected to the electric conduction pole terminal 630 to electrically connect the external power source or the load to the electric conduction pole terminal 630.

The contactor plate 652 may have a plate shape. In the illustrated embodiment, the contactor plate 652 may be formed in a disk shape.

The contactor plate 652 may be provided to include a conductive material. For example, the contactor plate 652 may include copper (Cu), silver (Ag), etc.

The saw-toothed ring 653 prevents twisting or movement of the tulip finger 654.

The fixing ring 653 is positioned at a radially outer side of the tulip finger 654 to support the tulip finger 654 at the radially outer side.

The saw-toothed ring 653 is provided to have a disk shape in which a plurality of saw teeth are provided on an outer circumferential surface. In one embodiment, a number of the saw teeth is identical to a number of tulip fingers 654.

The saw-toothed ring 653 may be provided to include a highly rigid material. For example, the saw-toothed ring 653 may include a metal material.

The saw-toothed ring 653 may be provided in plurality. In one embodiment, two saw-toothed rings 653 may be provided.

The tulip finger 654 increases contact force between the terminal of the external power source or the load and the vacuum circuit breaker 1.

The tulip finger 654 may be provided in plurality. The plurality of tulip fingers 654 are arranged along a circumferential direction of a concentric circle. In the illustrated embodiment, the plurality of tulip fingers 654 are all provided to have a same shape.

The tulip finger 654 is provided to have a plate shape extending in one direction. In the illustrated embodiment, the tulip finger 654 extends in an anteroposterior direction.

The fixing ring 651 is coupled to a radially outer side of the tulip finger 654. In addition, the contactor plate 652 and the saw-toothed ring 653 are coupled to each other at a radially inner side of the tulip finger 654. In summary, the radially outer side of the tulip finger 654 is supported by the fixing ring 651, and the radially inner side of the tulip finger 654 is supported by the contactor plate 652 and the saw-toothed ring 653.

2. Description of the Temperature Detection Sensor 70 According to an Embodiment of the Present Disclosure Hereinafter, referring to FIGS. 4 to 14, the temperature detection sensor 70 according to an embodiment of the present disclosure will be described.

The temperature detection sensor 70 measures and monitors temperature of a specific point of the vacuum circuit breaker 1.

The temperature detection sensor 70 is accommodated in the space defined inside the frame unit 10.

The temperature detection sensor 70 is arranged adjacent to the electric conduction pole 60. In detail, the temperature detection sensor 70 is arranged adjacent to the plate part 620 of the electric conduction pole 60. In the illustrated embodiment, the temperature detection sensor 70 is arranged adjacent to an upper side surface of the plate part 620.

The temperature detection sensor 70 may be coupled to the electric conduction pole 60 to measure temperature of a specific point of the electric conduction pole 60.

In the illustrated embodiment, the temperature detection sensor 70 includes the fixing band 710, the connection line 720, the fixing terminal 730, and a sensor body 740.

The fixing band 710 fixes the sensor body 740 to the electric conduction pole 60. In detail, the fixing band 710 fixes the sensor body 740 to the coupling member 620 of the electric conduction pole 60.

The fixing band 710 is arranged to surround the plate part 620. In this case, the fixing band 710 may pass through the band through hole 621 in the plate part 620. Accordingly, it is desirable to provide a cross-sectional area of the fixing band 710 to be smaller than that of the band through hole 621.

In addition, the fixing band 710 may be coupled through the sensor body 740. In detail, the fixing band 710 may be coupled through a band insertion opening 742a in the sensor body 740.

In the illustrated embodiment, the fixing band 710 may be formed in a ring shape. However, the fixing band 710 is not limited to the illustrated shape, and may be provided in various shapes.

In one embodiment, the fixing band 710 may be provided to include a high elastic material. For example, the fixing band 710 may include a synthetic rubber material.

The connection line 720 is coupled respectively to the fixing terminal 730 and the sensor body 740 to transmit temperature collected from the fixing terminal 730 to the sensor body 740. To do so, the connection line 720 is electrically connected respectively to the fixing terminal 730 and the sensor body 740.

In one embodiment, the connection line 720 is connected to an input unit in the sensor body 740. The input unit collects temperature data via the connection line 720 and transmit the temperature data to a data processing unit.

The connection line 720 is provided as a line extending in one direction. In the illustrated embodiment, the connection line 720 extends in an anteroposterior direction.

In one embodiment, the connection line 720 is accommodated in the terminal hole 631. That is, the connection line 720 extends to pass through the terminal hole 631.

The connection line 720 may be fixed to the plate part 620 of the electric conduction pole 60 by the fixing clamp 622. That is, arbitration deviation of the connection line 720 may be prevented by the fixing clamp 622.

In one embodiment, a part of the connection line 720 may be accommodated in an inner space of the sensor body 740. In the embodiment, the connection line 720 passes through a connection line coupling opening 743a to be coupled through the sensor body 740.

The connection line 720 may be provided in plurality. For example, two connection lines 720 may be provided. In this case, the respective connection lines 720 are spaced apart from each other and may measure temperatures of different points.

The fixing terminal 730 is a part at which the temperature detection sensor 70 directly measures temperature.

The fixing terminal 730 is fixed to be in contact with a specific point of which temperature is to be measured. In the illustrated embodiment, the fixing terminal 730 may be in contact with the tulip finger 650 to measure temperature of the tulip finger 650.

In one embodiment, the fixing terminal 730 may be accommodated in the terminal hole 631.

The fixing terminal 730 is coupled to the connection line 720 and transmits temperature data to the sensor body 740 via the connection line 720.

The fixing terminal 730 may be provided in plurality. In this case, the connection line 720 is coupled to each of the fixing terminals 730.

In the illustrated embodiment, the fixing terminal 730 includes a connection line coupling part 731 and a target contact part 732.

The connection line coupling part 731 is coupled respectively to the connection line 720 and the target contact part 732 to electrically connect the connection line 720 to the target contact part 732.

The connection line coupling part 731 is arranged to surround one end of the connection line 720.

In the illustrated embodiment, the connection line coupling part 731 is provided to have a cylindrical shape having a hollow hole therein. However, the connection line coupling part 731 is not limited to the illustrated shape, and may be provided in various shapes. For example, the connection line coupling part 731 may have a polyprism shape.

The target contact part 732 is coupled to one side of the connection line coupling part 731 arranged in a position opposite to the connection line 720.

The temperature measurement part 732 is a part at which the temperature detection sensor 70 directly measures temperature.

The target contact part 732 is arranged adjacent to a specific point of which temperature is to be measured.

Figure 6A:
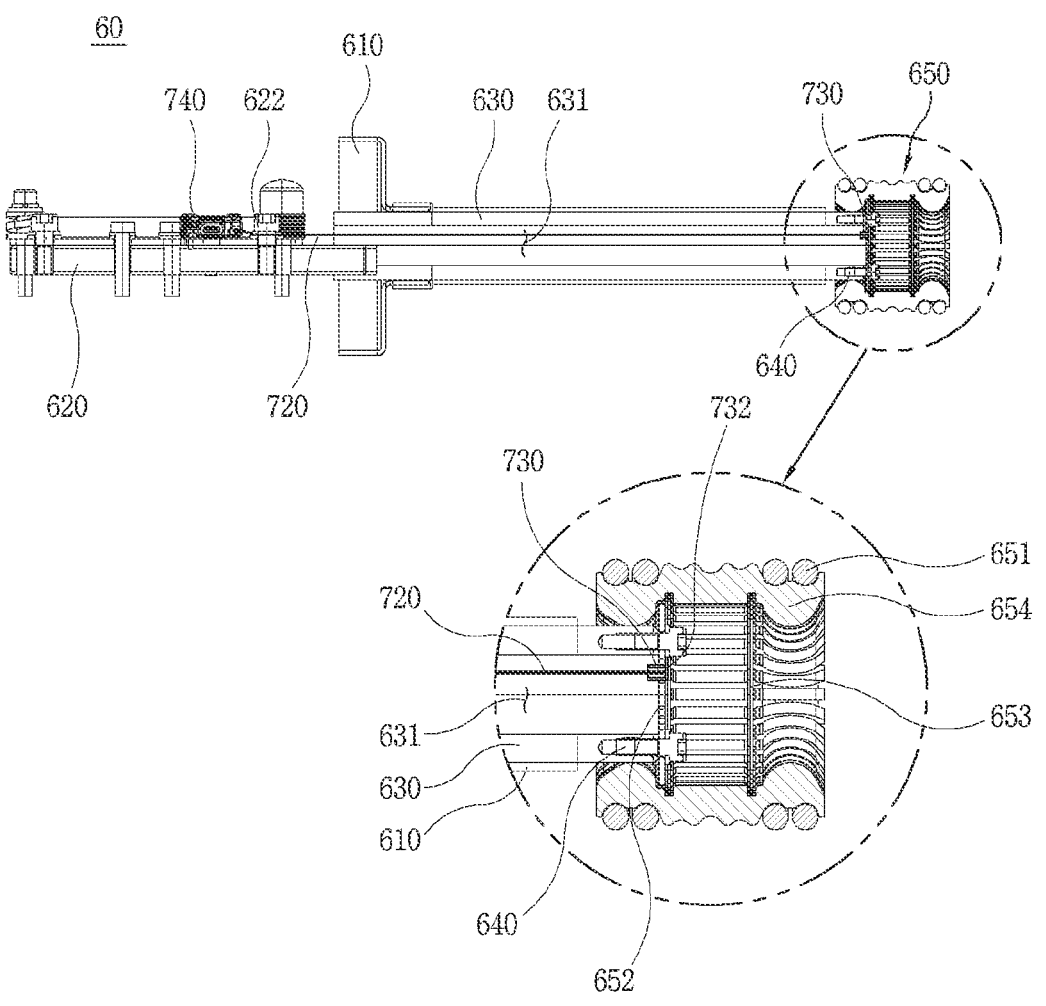
FIG. 6A is a side cross-sectional view of the electric conduction pole of FIG. 4.
Figure 6B:
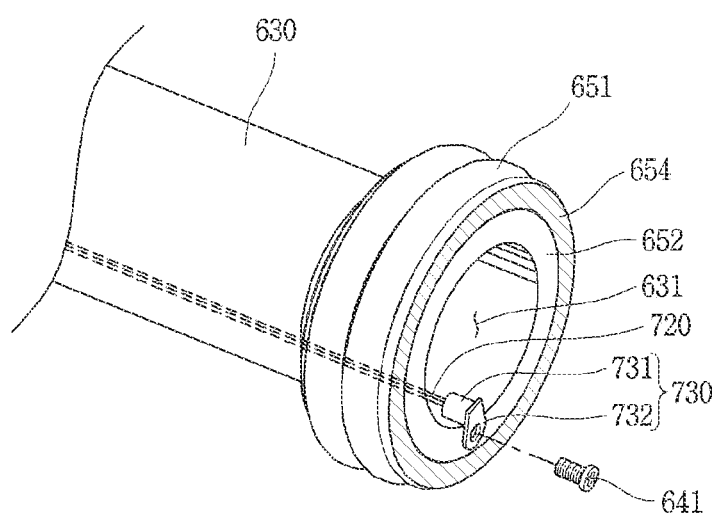
FIG. 6B is a perspective view for explaining the electric conduction pole of FIG. 4.

As illustrated in FIGS. 6A and 6B, the target contact part 732 may be fixed to the contactor plate 652 of the tulip contactor 650 by a bolt 641.

Figure 6C:
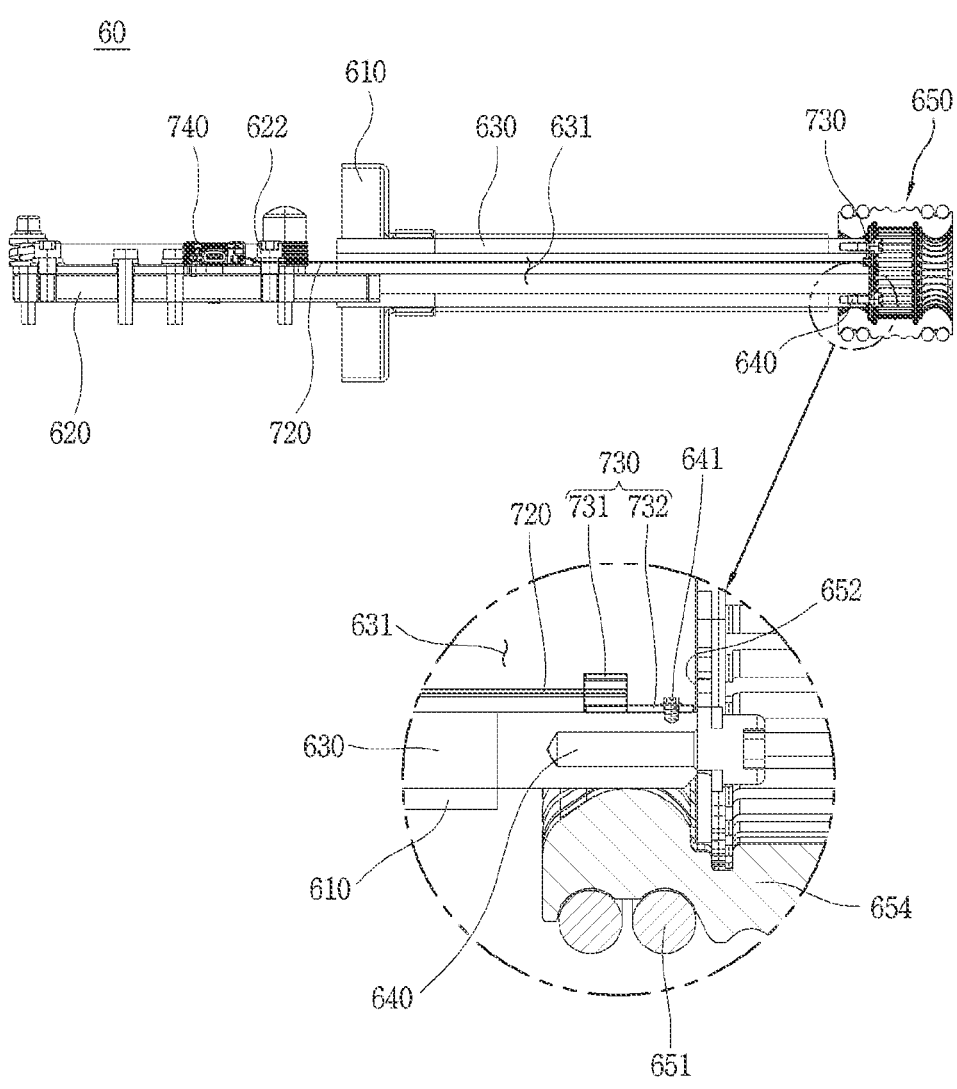
FIG. 6C is a side cross-sectional view for explaining an electric conduction pole according to another embodiment of the present disclosure.
Figure 7:
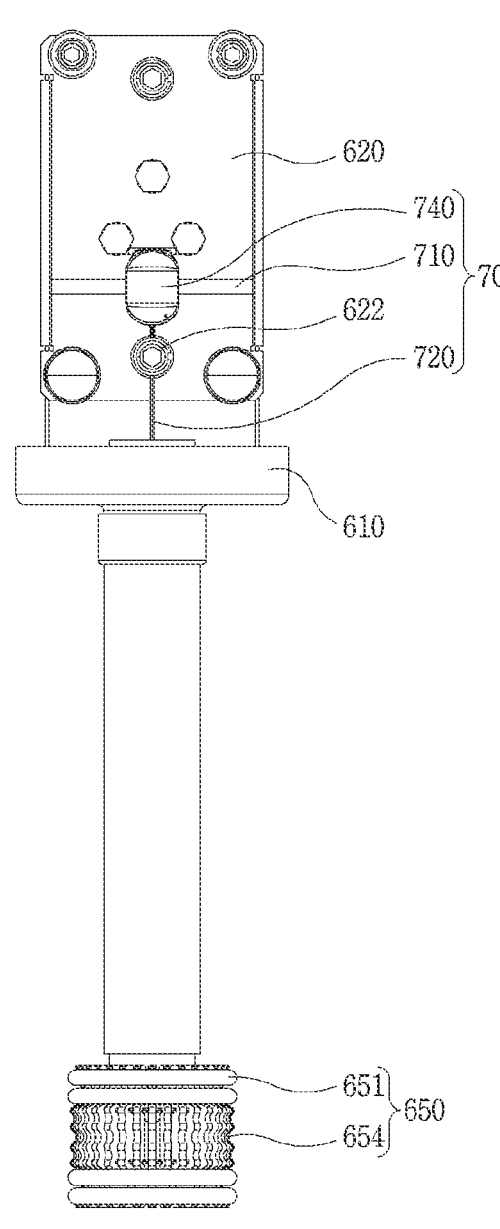
FIG. 7 is a plan view of the electric conduction pole of FIG. 4.
Figure 8:
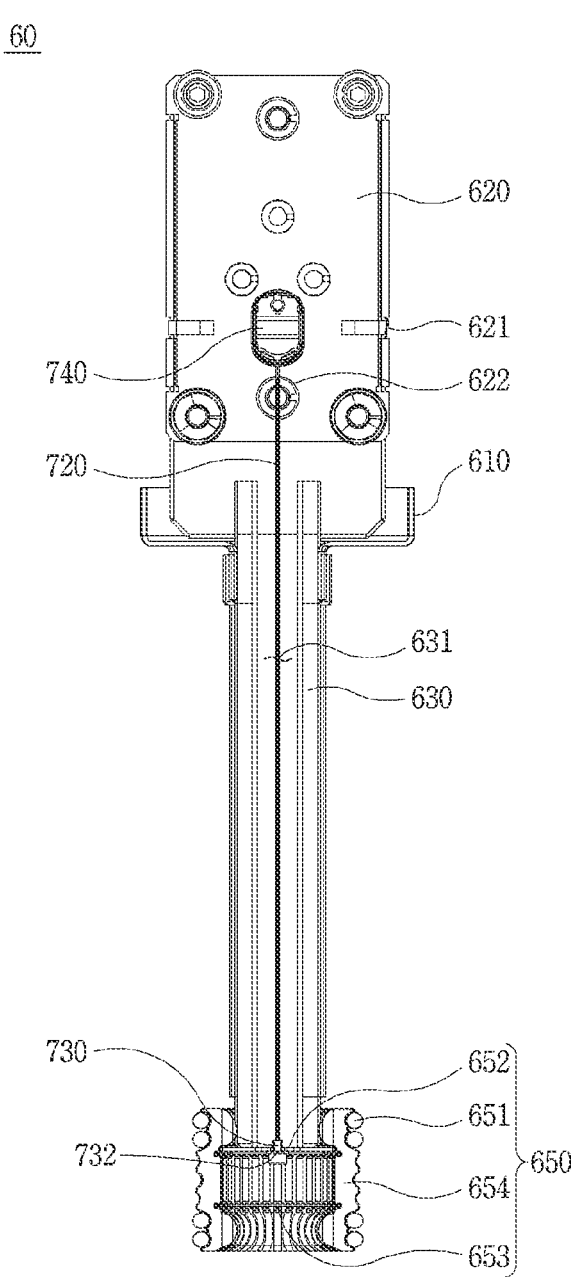
FIG. 8 is a plan cross-sectional view of the electric conduction pole of FIG. 4.
Figure 9:
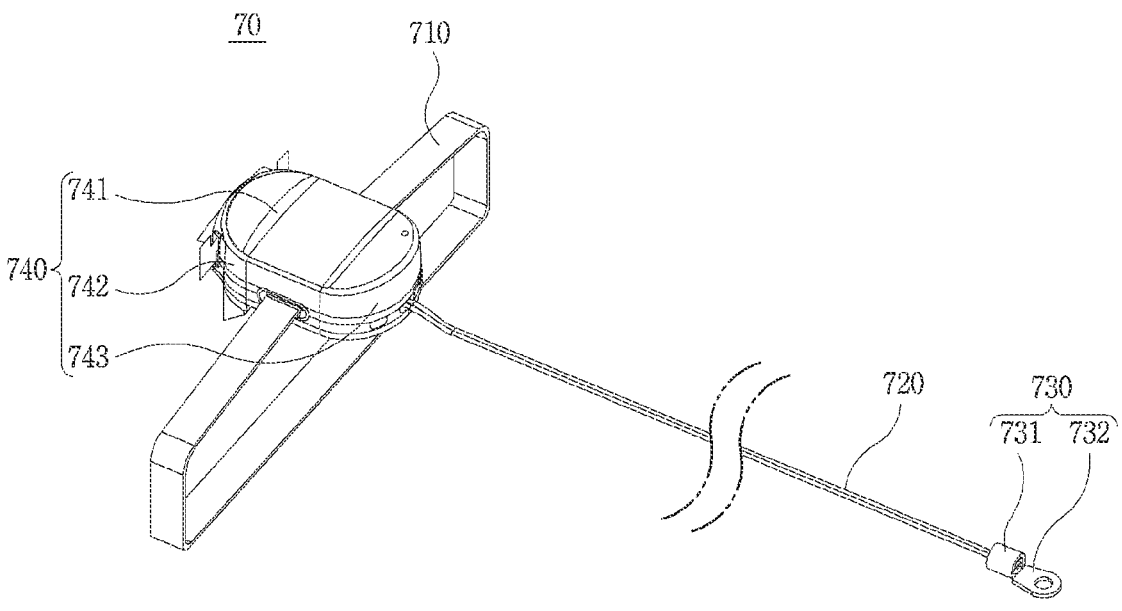
FIG. 9 is a perspective view of the temperature detection sensor included in the vacuum circuit breaker of FIG. 1.
Figure 10:
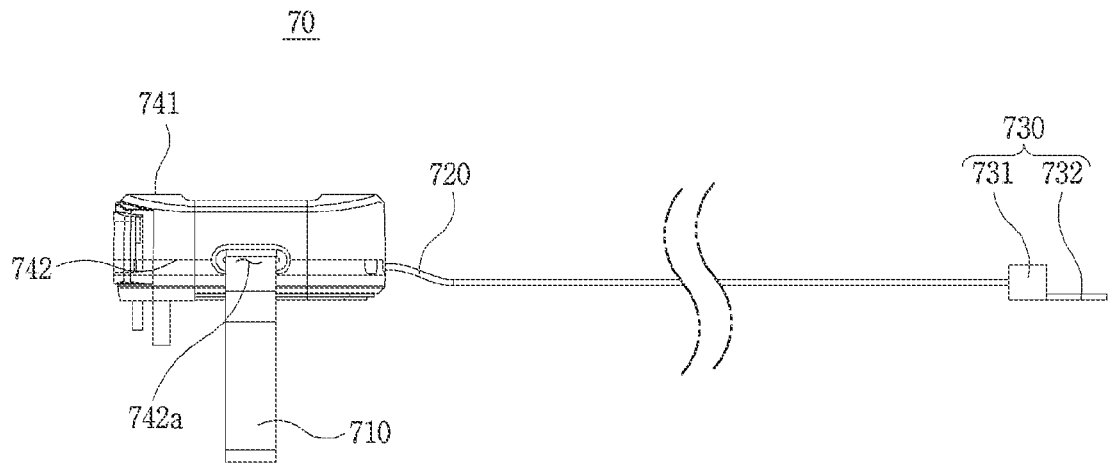
FIG. 10 is a side view of the temperature detection sensor of FIG. 9.
Figure 11:
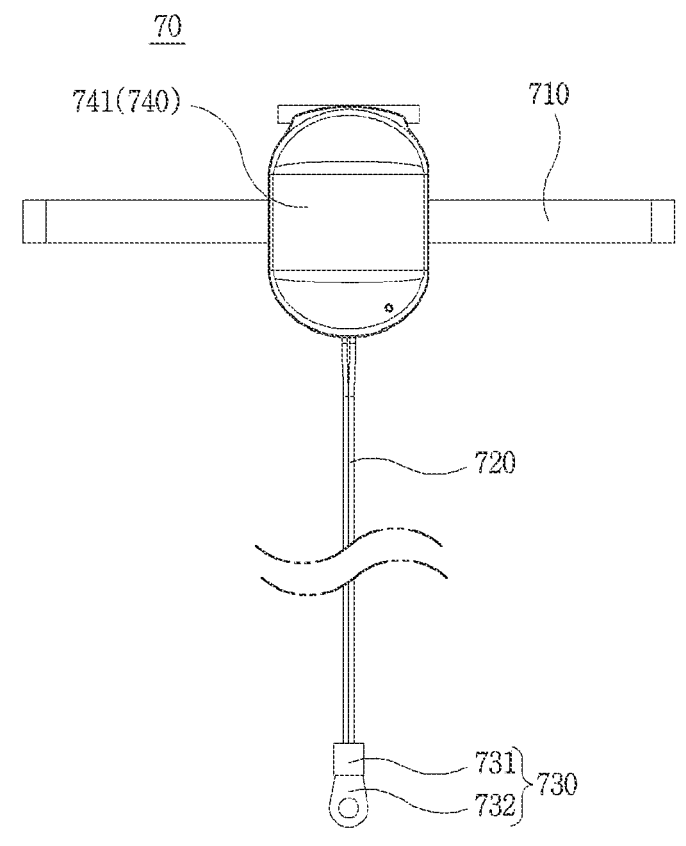
FIG. 11 is a plan view of the temperature detection sensor of FIG. 9.
Figure 12:
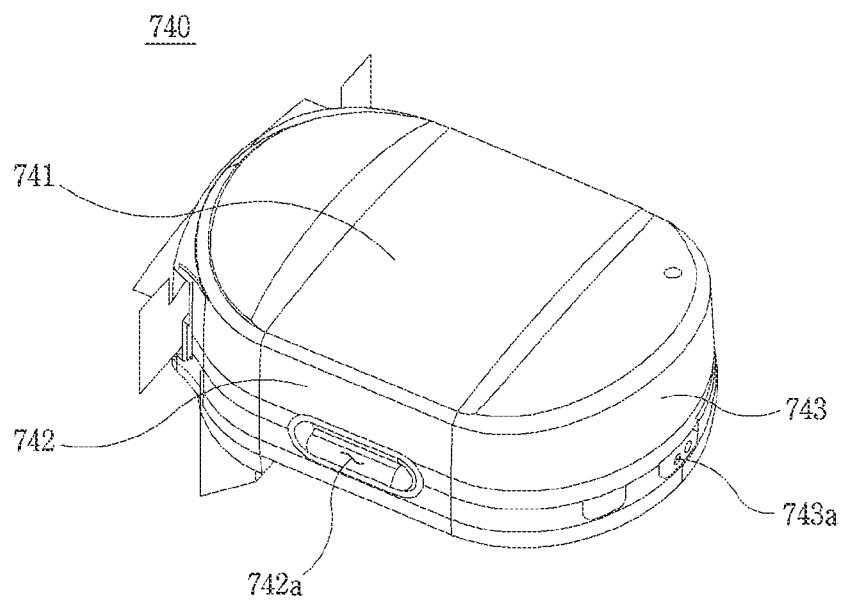
FIG. 12 is a perspective view of a sensor body included in the temperature detection sensor of FIG. 9.
Figure 13:
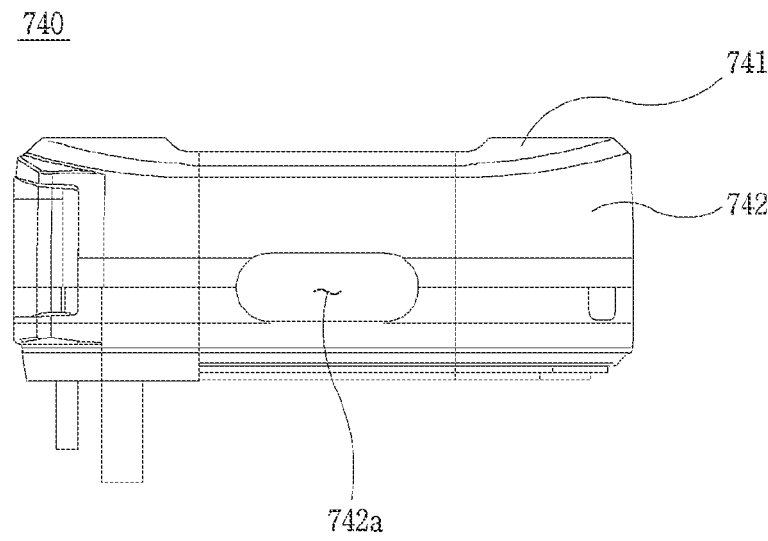
FIG. 13 is a side view of the sensor body of FIG. 12.
Figure 14:
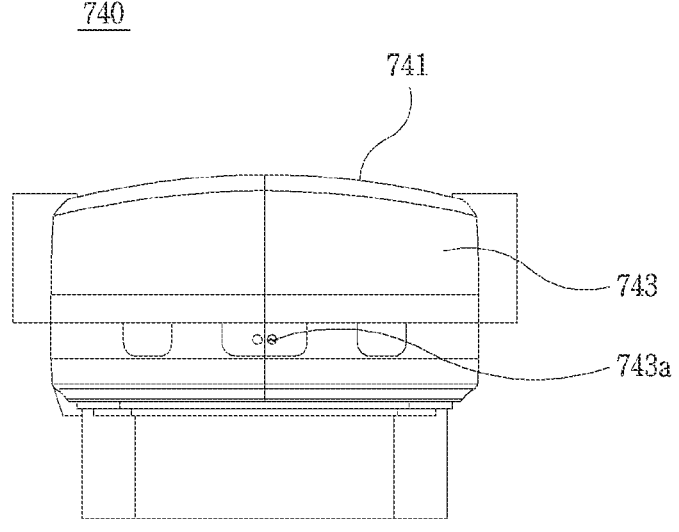
FIG. 14 is a front view of the sensor body of FIG. 12.

As illustrated in FIG. 6C, the target contact part 732 may be arranged adjacent to the contactor plate 652 of the tulip contactor 650. The target contact part 732 may be fixed by the bolt 641 to be adjacent to the contactor plate 652 in the electric conduction pole terminal 630. The connection line coupling part 731 is coupled to one side of the target contact part 732 arranged in a position opposite to the specific point.

The sensor body 740 processes temperature data collected from the target contact part 732 and transmits the temperature data to outside of the vacuum circuit breaker 1.

The sensor body 740 is arranged adjacent to the tulip contactor 620 of the electric conduction pole 60. In the illustrated embodiment, the sensor body 740 is arranged adjacent to an upper side surface of the plate part 620.

In addition, the sensor body 740 is coupled to the plate part 620.

In one embodiment, the sensor body 740 is coupled to the plate part 620 by the fixing band 710. The fixing band 710 passes respectively through the sensor body 740 and the plate part 620, and tightly couples the sensor body 740 to the plate part 620.

In another embodiment, a protruding part extending toward the plate part 620 is provided at one side of the sensor body 740. In addition, a recessed part is provided on one surface of the plate part 620 facing the sensor body 740. The protruding part may be coupled into the recessed part. In this case, the protruding part is provided to have a shape corresponding to the recessed part.

The connection line 720 is coupled to one side of the sensor body 740. In the illustrated embodiment, the connection line 720 is coupled to a front side of the sensor body 740.

A space for accommodating various components therein is defined in the sensor body 740. A power unit, an input unit, a data processing unit, and a communication unit may be included in the space.

The power unit provides a power source configured to operate the temperature detection sensor 70.

The input unit is coupled to the connection line 720 to collect temperature data transmitted via the fixing terminal 730 and the connection line 720, and transmit the temperature data to the data processing unit.

The data processing unit arranges data transmitted from the input unit, and then, transmits the data to the communication unit.

The communication unit transmits the data transmitted from the data processing unit to outside of the vacuum circuit breaker 1. A user may check the data transmitted by the communication unit to measure and monitor temperature of the vacuum circuit breaker 1.

In the illustrated embodiment, the sensor body 740 is divided into a body upper surface portion 741, a body side surface portion 742, and a body front surface portion 743.

The body upper surface portion 741, the body side surface portion 742, and the body front surface portion 743 form boundaries at an upper side, left and right sides and a front side of the sensor body 740, respectively.

The body side surface portion 742 extends from each end of the left and right sides of the body front surface portion 741 toward a lower side. That is, the body side surface portion 742 is consecutive to a left or right-side end of the body upper surface portion 741.

A band insertion opening 742a is provided in the body side surface portion 742.

The band insertion opening 742a is a space through which the fixing band 710 is coupled. To do so, it is desirable to provide a cross-sectional area of the band insertion opening 742a to be greater than that of the fixing band 710.

In the illustrated embodiment, the band insertion opening 742a is provided such that an oval cross-section extends. However, the band insertion opening 742a is not limited to the illustrated shape, and may be provided in various shapes. For example, the band insertion opening 742a may be provided such that a polygonal cross-section extends.

The body front surface portion 743 extends from an end of the front side of the body upper surface portion 741 toward a lower side. That is, the body front surface portion 743 is consecutive to the end of the front side of the body front surface portion 741.

The connection line coupling opening 743a is provided in the body front surface portion 743.

The connection line coupling opening 743a is a space through which a connection opening is coupled. To do so, it is desirable to provide a cross-sectional area of the connection line coupling opening 743a to be greater than that of the connection line 720.

In the illustrated embodiment, the connection line coupling opening 743a is provided such that a round cross-section extends. However, the connection line coupling opening 743a is not limited to the illustrated shape, and may be provided in various shapes. For example, the connection line coupling opening 743a may be provided such that a polygonal cross-section extends.

A single or a plurality of connection line coupling openings 743a may be provided. In this case, a number of the connection line coupling openings 743a is provided to be identical to a number of the connection lines 720.

Although the foregoing description has been given with reference to the preferred embodiments of the present disclosure, the present disclosure is not limited to the configuration of the above-described embodiments.

In addition, it should be understood that the present disclosure can be variously modified and changed by those skilled in the art to which the present disclosure pertains without departing from the spirit and scope of the present disclosure described in the claims below.

Furthermore, all or part of those embodiments may be selectively combined so that various modifications can be made.

The invention claimed is:

1. A vacuum circuit breaker comprising:
    an electric conduction pole electrically connected to an external power source or a load; and
    a temperature detection sensor disposed adjacent to the electric conduction pole,
    wherein the electric conduction pole comprises:
        a plate part provided to have a plate shape; and an electric conduction pole terminal provided to have a column shape extending in one direction and having one end coupled to the plate part, and wherein the temperature detection sensor comprises:

a sensor body arranged adjacent to one side of the plate part and having an input unit accommodated therein;

a fixing band coupled to the sensor body and arranged to surround the plate part, wherein the fixing band passes through a band through hole provided in the plate part, and is coupled to the plate part;

a fixing terminal which is in contact with a specific point of the electric conduction pole and configured to measure temperature of the specific point; and a connection line positioned in the electric conduction pole terminal, and having one end coupled to the sensor body and another end coupled to the fixing terminal.

2. The vacuum circuit breaker of claim 1, wherein the electric conduction pole comprises a tulip contactor in direct contact with a terminal of the external power source or the load, and the specific point is positioned in a part of the tulip contactor.

3. The vacuum circuit breaker of claim 1, wherein the fixing terminal comprises:

a connection line coupling part surrounding the another end of the connection line; and a target contact part being in contact with the specific point and coupled to the connection line coupling part.

4. The vacuum circuit breaker of claim 3, wherein the electric conduction pole comprises a tulip contactor in direct contact with a terminal of the external power source or the load, and the target contact part is in contact with a part of the tulip contactor.

5. The vacuum circuit breaker of claim 1, wherein the fixing band passes through a band insertion opening provided in the sensor body, and is coupled to the sensor body.

6. The vacuum circuit breaker of claim 1, wherein a protruding part extending toward the plate part is provided at one side of the sensor body, and a recess part is provided on one surface of the plate part facing the sensor body, the recess part having a shape corresponding to the protruding part and the protruding part being inserted through the recess part.

7. The vacuum circuit breaker of claim 1, wherein the electric conduction pole comprises a fixing clamp surrounding a part of the connection line and coupled to one surface of the plate part facing the connection line to have the connection line therebetween.

8. The vacuum circuit breaker of claim 1, wherein the connection line extends or retracts to correspond to a distance between the sensor body and the fixing terminal.

9. The vacuum circuit breaker of claim 1, wherein the fixing terminal is provided in plurality, and the plurality of fixing terminals are coupled to different connection lines, respectively.

10. The vacuum circuit breaker of claim 1, wherein the input unit collects temperature data from the fixing terminal, and the temperature detection sensor comprises:

a data processing unit configured to receive the temperature data from the input unit and process the temperature data; and a communication unit configured to transmit, to outside, the temperature data arranged by the data processing unit.

11. The vacuum circuit breaker of claim 1, wherein a terminal hole is provided in the electric conduction pole terminal.

12. The vacuum circuit breaker of claim 11, wherein the fixing terminal is accommodated in the terminal hole and coupled to one end of the electric conduction pole terminal.

13. A vacuum circuit breaker comprising:

an electric conduction pole electrically connected to an external power source or a load; and a temperature detection sensor disposed adjacent to the electric conduction pole, wherein the electric conduction pole comprises:

a plate part provided to have a plate shape; and an electric conduction pole terminal provided to have a column shape extending in one direction and having one end coupled to the plate part, and wherein the temperature detection sensor comprises:

a sensor body arranged adjacent to one side of the plate part and having an input unit accommodated therein;

a fixing terminal which is in contact with a specific point of the electric conduction pole and configured to measure temperature of the specific point; and a connection line positioned in the electric conduction pole terminal, and having one end coupled to the sensor body and another end coupled to the fixing terminal, and wherein a protruding part extending toward the plate part is provided at one side of the sensor body, and a recess part is provided on one surface of the plate part facing the sensor body, the recess part having a shape corresponding to the protruding part and the protruding part being inserted through the recess part.

14. A vacuum circuit breaker comprising:

an electric conduction pole electrically connected to an external power source or a load; and a temperature detection sensor disposed adjacent to the electric conduction pole, wherein the electric conduction pole comprises:

a plate part provided to have a plate shape; and an electric conduction pole terminal provided to have a column shape extending in one direction and having one end coupled to the plate part, and wherein the temperature detection sensor comprises:

a sensor body arranged adjacent to one side of the plate part and having an input unit accommodated therein;

a fixing terminal which is in contact with a specific point of the electric conduction pole and configured to measure temperature of the specific point; and a connection line positioned in the electric conduction pole terminal, and having one end coupled to the sensor body and another end coupled to the fixing terminal, and wherein the electric conduction pole comprises a fixing clamp surrounding a part of the connection line and coupled to one surface of the plate part facing the connection line to have the connection line therebetween.

* * * * *